United States Patent [19]

Abledu

[11] Patent Number: 5,934,582
[45] Date of Patent: Aug. 10, 1999

[54] FOOD PROCESSING ARRANGEMENT

[76] Inventor: Kodzo O. Abledu, 2110 Cooley Pl., Pasadena, Calif. 91104

[21] Appl. No.: 09/002,810

[22] Filed: Jan. 5, 1998

Related U.S. Application Data

[60] Provisional application No. 60/035,749, Jan. 6, 1997.

[51] Int. Cl.$^6$ .............................. A47J 43/04; B02C 19/00
[52] U.S. Cl. .................................................... 241/199.12
[58] Field of Search ................. 241/100, 199.7, 241/199.12, 199, 199.5, 277

[56] References Cited

U.S. PATENT DOCUMENTS

| | | |
|---|---|---|
| 3,809,322 | 5/1974 | Hirosawa . |
| 3,901,411 | 8/1975 | Bauman . |
| 3,988,114 | 10/1976 | Gorin et al. . |
| 4,046,496 | 9/1977 | Gorin et al. . |
| 4,403,867 | 9/1983 | Duke . |
| 4,772,434 | 9/1988 | Myers . |
| 4,785,727 | 11/1988 | Miyata et al. . |
| 5,524,530 | 6/1996 | Nijzingh et al. . |
| 5,535,665 | 7/1996 | Wong . |
| 5,555,796 | 9/1996 | Kortschot et al. . |
| 5,562,020 | 10/1996 | Shigeshiro . |
| 5,628,247 | 5/1997 | Palumbo et al. . |

FOREIGN PATENT DOCUMENTS

837042 3/1952 Germany ............................ 241/199.7

*Primary Examiner*—Mark Rosenbaum
*Attorney, Agent, or Firm*—Don Finkelstein

[57] ABSTRACT

A food processing arrangement for mashing various food products to provide a food of the nature of West African fufu. The food processor has a base unit with an electrically powered motor rotating a drive train. A mashing unit having a roller is removably mounted on the base unit and is driven by the drive train and a bowl is removably mounted on the base unit and the roller of the masher unit is positioned in the food receiving cavity of the bowl. The roller has gear teeth which engage matching gear teeth on the inside surface of the bowl so that the roller rotates the bowl about the bowl axis as the roller rotates about the roller axis. Food in the food receiving cavity is mashed between the inside surface of the bowl and the outer surface of the roller. A scraper is provided to scrape food from the outside surface of the roller and the inside surface of the bowl and is positioned to direct the food so scraped to a predetermined location where the mashed food may be removed from the bowl.

14 Claims, 7 Drawing Sheets

FOOD PROCESSING ARRANGEMENT

REFERENCE TO RELATED APPLICATION

Applicant claims the benefit under 35 USC § 119(e), [37 CFR § 1.78(a)(3)] of Provisional Application No. 60/035,749 Filed Jan. 6, 1997.

BACKGROUND OF THE INVENTION

1. Field of the Invention

This invention relates to the food processing art and more particularly to an electrically powered machine for preparing various types of cooked foods such as fufu a staple West African food.

2. Description of the Prior Art

In many West African cultures, the preparation of food products has traditionally been accomplished by various cooking processes over open fires. In such processes for the preparation of fufu, a staple of West African cooked foods, the major ingredient, such as cassava, plantains, yams cocoyams and the like are first boiled. The boiled product is then mashed and pounded manually into a paste. A mortar type container holds the product and a wooden or similar pestles is used to accomplish the mashing. The ingredients being pounded are turned by hand during the pounding and mashing process in an attempt to ensure the proper and desired mashing of all lumps of the product.

In comparatively recent times a powdered form of the product, often called fufu powder, has been introduced in an attempt to provide a more rapid and uniform finished product. Such fufu powder is cooked over an open fire to provide the finished fufu food.

With the emigration of many West Africans to the industrialized countries of the world, the opportunity to cook over open fires has decreased. Further, the availability of electricity to power food processing machines has made it desirable to prepare fufu and other traditional West African foods using the labor saving electrically powered devices. The preparation of the traditional foods using the electrically powered devices also can provide a more consistent finished food product. Thus, there has been a need for electrically powered food processing machines that will enable the preparation of the traditional West African, and other, food products.

SUMMARY OF THE INVENTION

It is an object of the present invention to provide an electrically powered food processing arrangement.

It is another object of the present invention to provide an electrically powered food processing arrangement capable of preparing traditional food products.

It is another object of the present invention to provide an electrically powered food processing arrangement for preparing traditional West African food products such as fufu.

The above, and other objects of the present invention are achieved, according to a preferred embodiment thereof, by providing a base unit having a motor and drive system in a force bearing framework. A mixing bowl is detachably and rotatably mounted on the base and a mashing unit is positionable in the bowl and operatively connected to the drive system. The mashing unit has a roller having rounded surfaces that are tangential to the inner surface of the bowl and other surfaces, such as flat surfaces to provide an uneven aspect for facilitating the initial mashing of the boiled ingredients which, in this embodiment of then present invention, are to be made into fufu. A pinion gear is mounted on the top of the roller and the pinion gear engages a drive gear on the inside of the bowl at the top portion thereof. As the roller is rotated by the drive unit, the pinion gear also rotates the bowl and the ingredients are mashed between the roller and the inner surface of the bowl. The gear driven bowl prevents the slippage of the roller when there is no food product between the roller and the bowl.

A scraper unit is mounted on the mashing unit in food clearing relationship to both the inner surface of the bowl and the surfaces of the roller. The scraper unit is generally a "U" shaped unit in which one leg of the "U" is scrapes food from the roller and the other leg of the "U" scrapes food from the inner surface of the bowl. The two legs of the "U" are positioned so that food removed from both the surface of the roller and from the surface of the bowl are directed to the space between the legs of the "U" shaped scraper. At the end of the mashing process, food may be removed from the bowl by inserting a scoop between the legs of the "U" shaped scraper and scooping up a portion of the mashed food which, in the preferred embodiment of the present invention may be accomplished while the unit is operating.

The base unit is provided with an electric motor which rotates a drive shaft connected to the roller of the mashing unit. The base unit also rotatably supports the bowl on a base plate portion and has a plurality of rotating discs or roller bearings engaging the outer surface of the bowl. The force of the roller on the bowl keeps the bowl in contact with the roller bearings as the roller of the mashing unit is rotated by the drive shaft.

BRIEF DESCRIPTION OF THE DRAWINGS

The above and other objects of the present invention may be more fully understood from the following detailed description taken together with the accompanying drawing wherein similar reference characters refer to similar elements throughout and in which.

DESCRIPTION OF THE PREFERRED EMBODIMENTS

Figure 1:
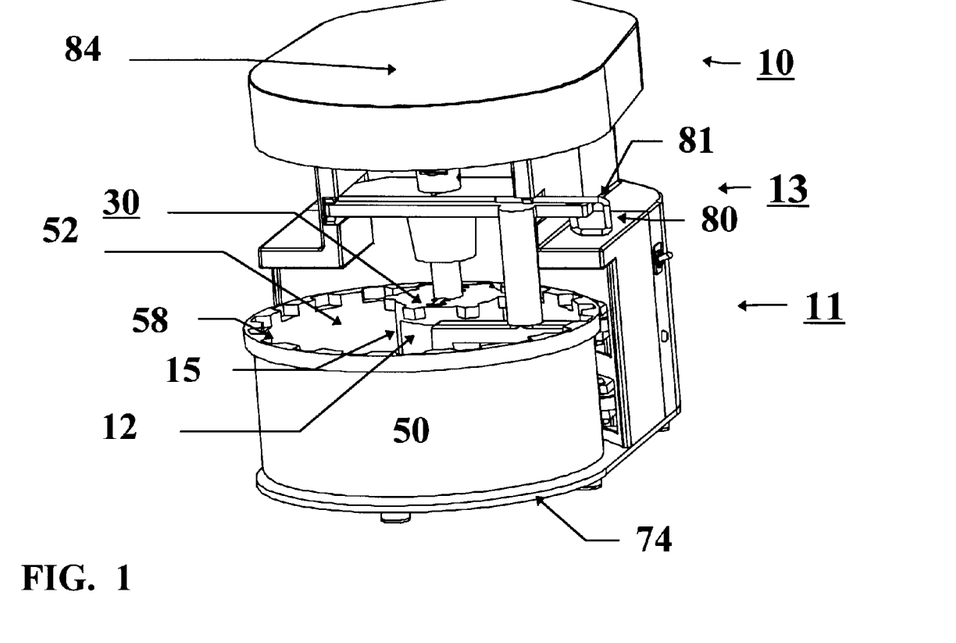
FIG. 1 is a perspective view of a food proceeding machine according to the principles of the present invention.
Figure 2:
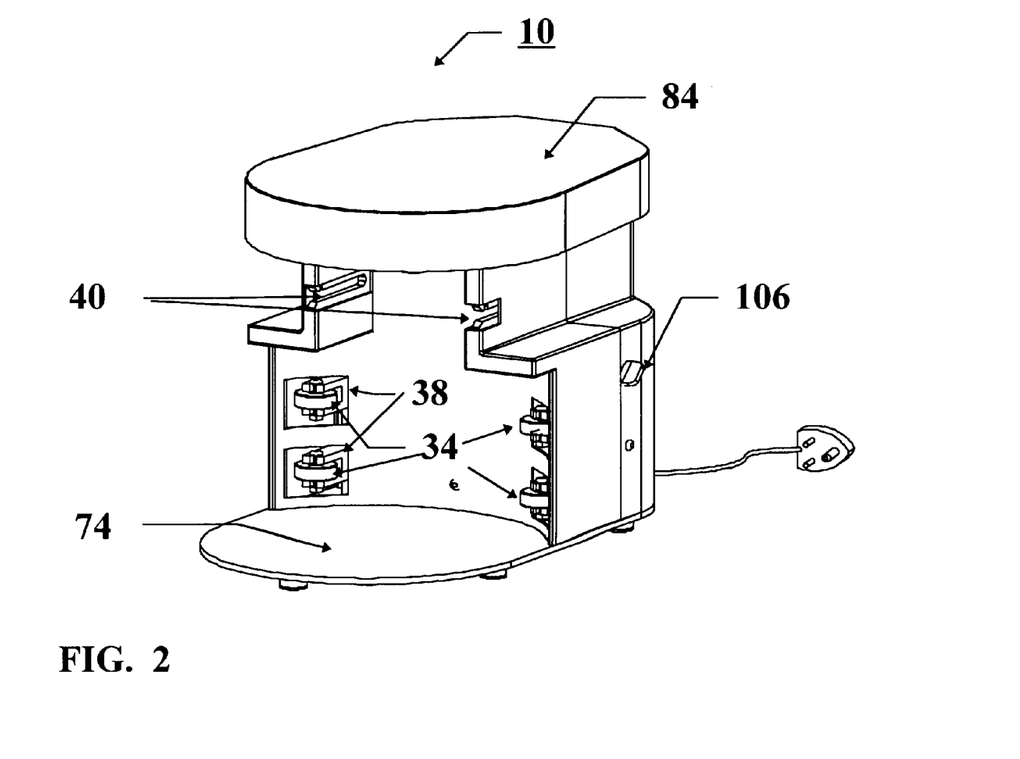
FIG. 2 is a perspective view of a base unit useful in the practice of the present invention.

Referring now to the drawing there is illustrated an embodiment, generally designated 11, of a food processing machine 13 according to the principles of the present invention. The food processing machine 13 is generally comprised of a base unit 10, as shown in perspective in FIG.

Figure 3:
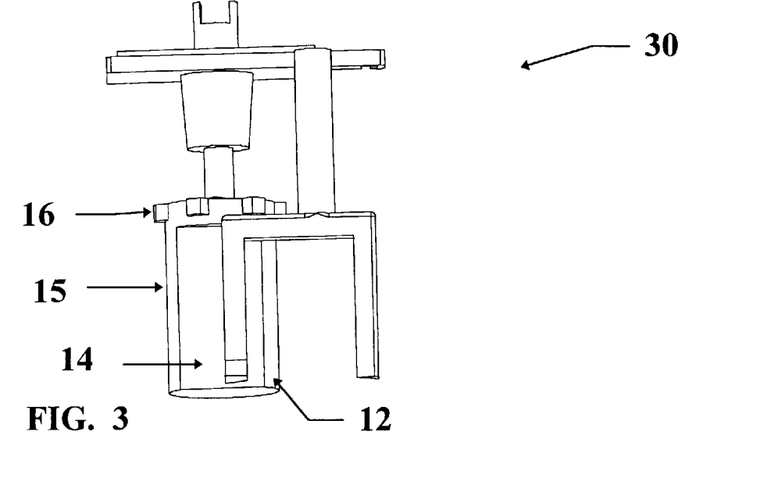
FIG. 3 is a perspective view of a mashing unit useful in the practice of the present invention.
Figure 4:
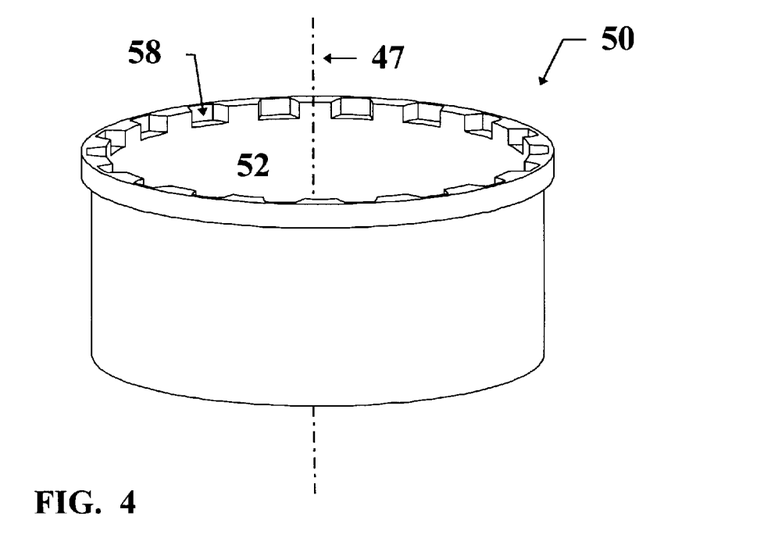
FIG. 4 is a perspective view of a bowl useful in the practice of the present invention.

2, a masher unit 30 as shown in perspective on FIG. 3 and a bowl 50 as shown in perspective on FIG. 4 which are detachably mountable together for operation and may be easily separated for cleaning, servicing or the like.

Figure 5:
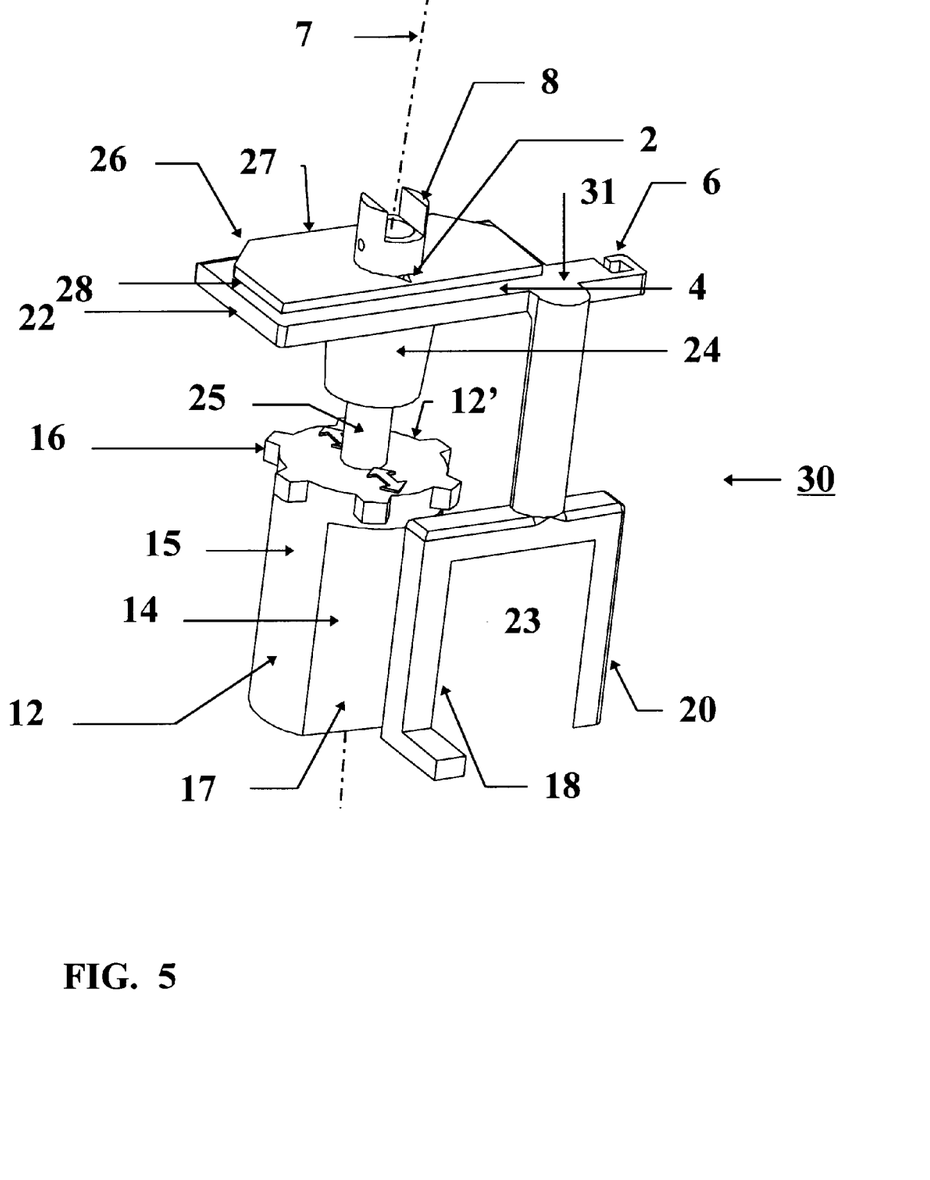
FIG. 5 is a detailed perspective view of the masher unit.

FIG. 5 illustrates, in a detailed perspective view, the mashing unit 30 of the embodiment 11 of the present invention. As shown on FIG. 5, the mashing unit 30 has a rigid frame generally indicated at 31 and a roller 12 rotatably mounted on the rigid frame 31 for rotation about an axis 7. The roller 12 has an outer surface having a first portion with a curved face 15 having a first preselected curvature that is adapted to bear against the inside surface 52 of bowl 50 and is tangential thereto. The roller 12 also has a second portion 17 that is an uneven portion such as flat surface 14 to facilitate the initial mashing of the food ingredients (not shown) into smaller bits. In preferred embodiments of the present invention, a substantial portion of the roller 12 is tangential to the surface 52 of bowl 50. Multiple flat surfaces could be included on the roller 12 as may be desired for some applications. For the preparation of fufu, the food ingredient placed into the bowl 50 may be boiled cassava, plantains, yams, cocoyams or the like.

The mashing unit 30 is also provided with a pinion gear 16 at the top portion 12' of the roller 12. The teeth of the pinion gear 16 are adapted to engage the gear teeth 58 of bowl 50 so that as the roller 12 is rotated the bowl 50 is rotated about an axis 47 (FIG. 4). The engagement of the pinion gear 16 with the gear 58 of bowl 50 prevents slippage of the roller 12. If the bowl 50 is not rotated during rotation of the roller 12, the roller would tend to slip when there is no food material lodged between the roller 12 and bowl 50.

Two scrapers 18 and 20 are also provided on the mashing unit 30. Scraper 18 removes food adhering to the roller 12 and scraper 20 removes food from the inside surface 52 of bowl 50. In preferred embodiments of the present invention, the two scrapers 18 and 20 are placed so that the food removed from the roller 12 and/or the inside surface 52 of the bowl 50 are directed into the space 23 between the scrapers 18 and 20. Directing the food so scraped from the roller 12 and the surface 52 of bowl 50 into the space 23 facilitates the removal of processed food from the food processor 13 by allowing insertion of, for example, a scoop (not shown) into the space 23 while the food processor is operating.

Figure 6A:
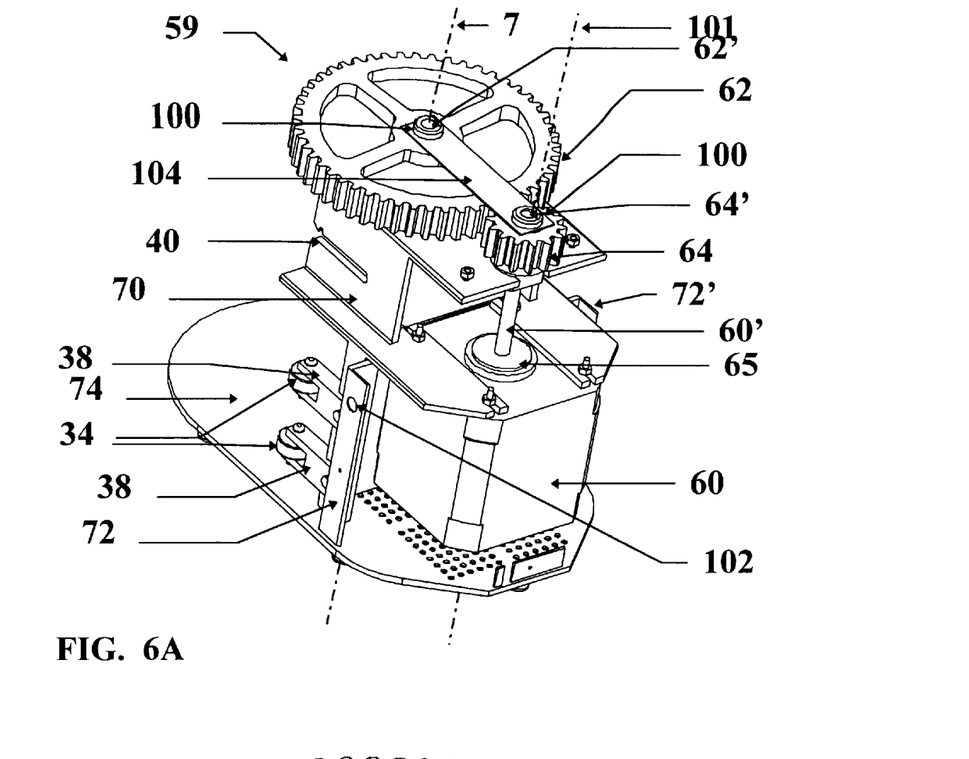
FIGS. 6A and 6B are perspective views of the base unit.
Figure 6B:
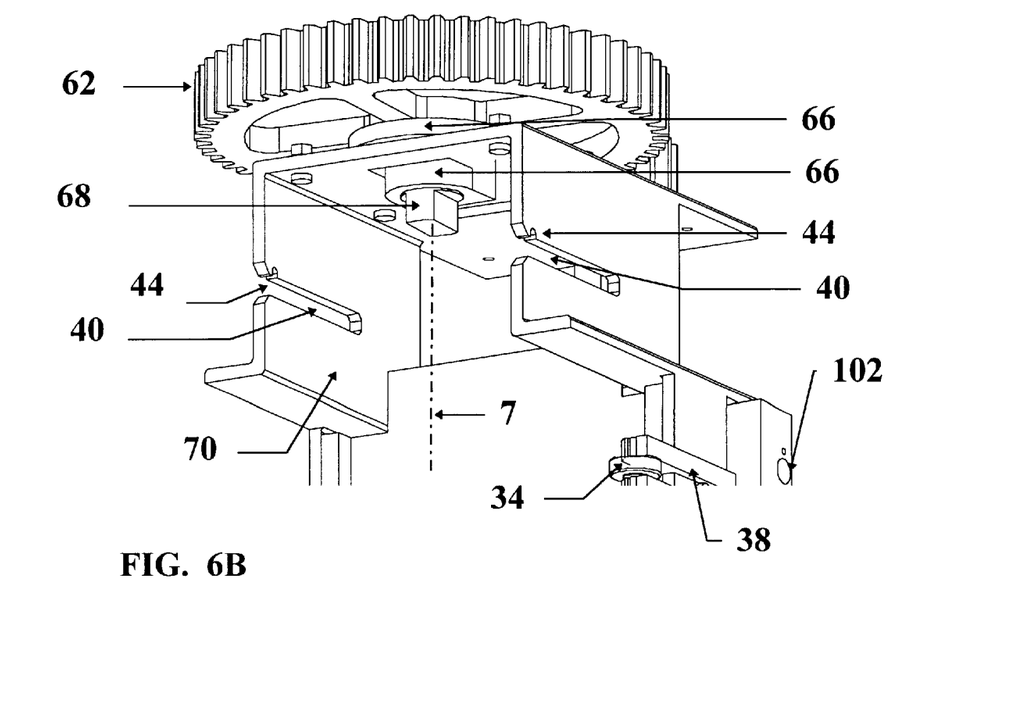

In preferred embodiments of the present invention the mashing unit 30 is removably mounted on the base unit 10. Referring now to FIGS. 6A and 6B as well as FIG. 5, the rigid frame 31 of the mashing unit 30 is provided with a mounting plate 22 which fits into parallel slots 40 in a rigid framework which may be a metal framework 70 of the base unit 10. A sleeve bearing 24 is mounted on the plate 22 and extends downwardly therefrom. Shaft 25 which rotates the roller 12 extends through sleeve bearing 24. If desired, a small depression 2 may be provided on the top of sleeve bearing 24 to allow lubrication thereof. The plate 22 transmits the forces associated with the mashing of the food between the roller 12 and the surface 52 of the bowl 50 to the metal framework 70 of the base unit 10 into which the plate 22 is inserted. The upper surface 27 of plate 22 is preferably recessed as shown at 28 and chamfered as shown at 26 to facilitate the insertion of plate 22 into slots 40 of the base unit 10. A shoulder 4 on plate 22 is aligned with notches 44 in the framework 70 for the condition of the mashing unit 30 fully inserted into the slots 40 of the framework 70. A restraining key 80 (FIG. 10B) is inserted into the notches 44 to restrain the mashing unit 30 therein and a loop end 81 of the key 80 is positioned in a detent or aperture 6 in the mashing unit 30 to prevent the key 80 from falling out of engagement with the mashing unit 30 and the base unit 10 during operation.

Figure 4A:
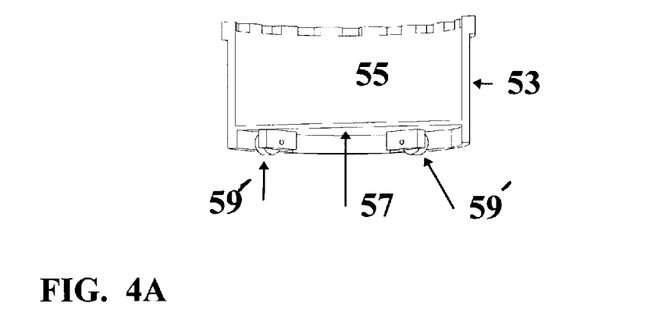
FIG. 4A is a partial sectional view of an alternative structure of a bowl useful in the practice of the present invention.

The bowl 50 is positioned on a base plate 74 of the rigid framework 70 of the base unit 10 and bears against side roller bearings 34. If desired, a lubricant may be placed on the base plate 74 to facilitate the rotation of the bowl 50 thereon. alternatively, as shown on FIG. 4A an alternative structure of a bowl 53 defining a food receiving cavity 55 has a bottom plate 57 to which a plurality of base rollers 59' are coupled. The side roller bearings 34 are mounted in arms 38 extending from the metal framework 70 of the base unit 10. The side roller bearings 34 provide the structure for the reaction to the forces generated as the roller 12 crushes food against the inside surface 52 of the bowl 50 during the operation of the food processor 11 as well helping to keep the bowl 50 properly aligned during operation.

The side roller bearings 34 could, in another embodiment of then present invention, be replaced by rollers inside the bowl 50 to maintain the bowl 50 in place. Such inside rollers would be placed diametrically opposite the roller 12 to provide the reaction to the forces generated during the food crushing operation of the roller 12. More than two such inside roller bearings could be utilized and would be placed around the circumference of the bowl 50 in such a manner to provide the reaction to the food crushing forces generated during operation as well as to prevent tipping of the bowl 50. Similarly, in yet another embodiment of the present invention, the bowl 50 could be fixed and the roller 12 could be driven to revolve around the periphery of the bowl 50 as well as rotate about its own axis to provide the crushing of the food between the inside surface 52 of the bowl 50 and the roller 12.

Figure 7:
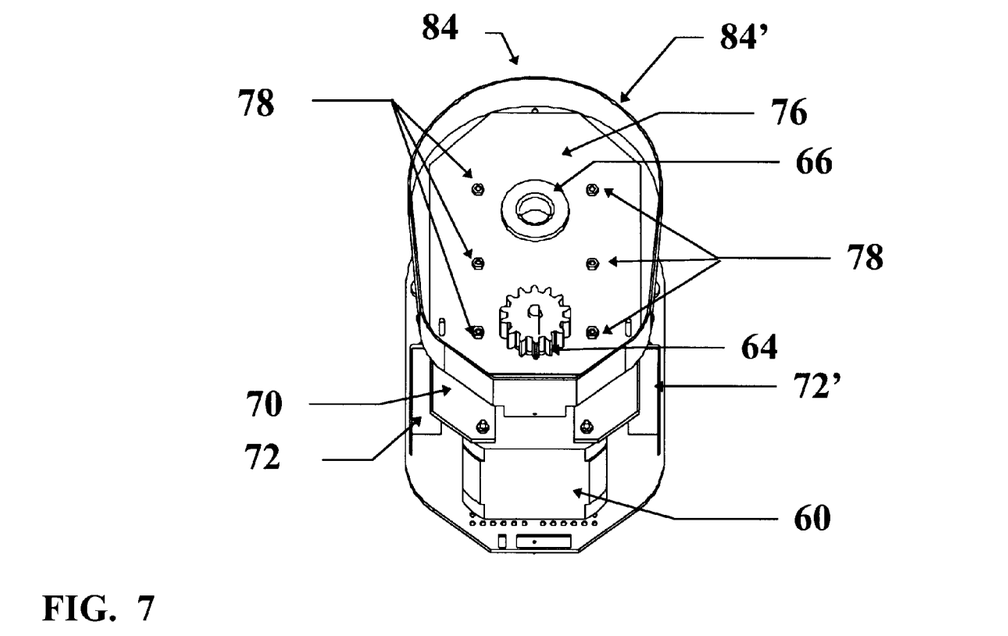
FIGS. 7 and 8 are perspective views of the gear housing of the base unit.
Figure 8:
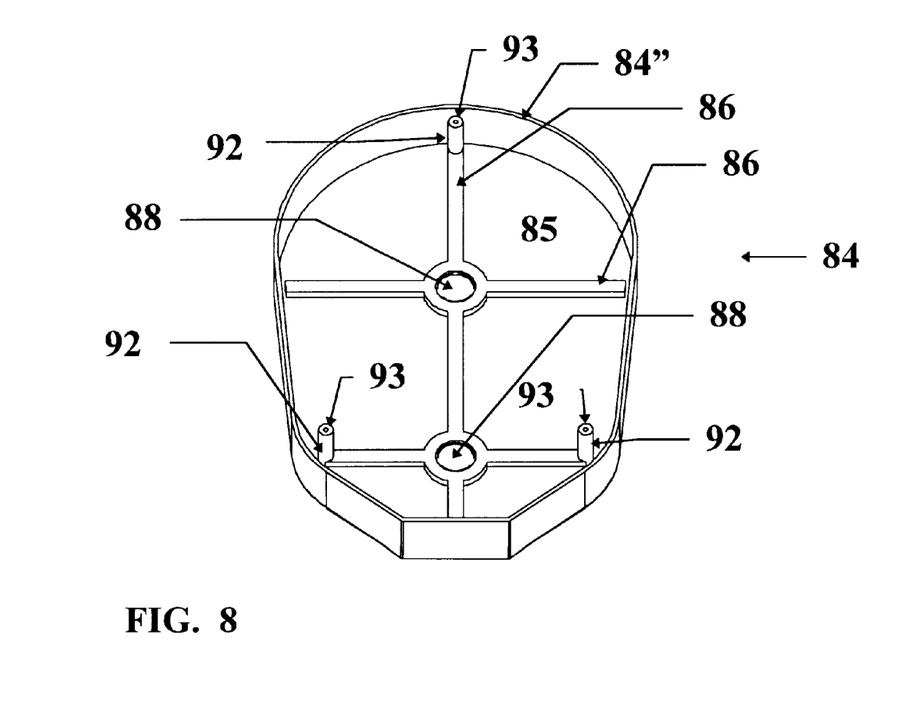

An electric motor 60 is mounted on the metal framework 70 as shown in FIG. 6A and drives a drive train which in the embodiment 11 is a speed reduction gearing arrangement 59 comprised, in this embodiment 11 of the present invention, of gears 62 and 64. The gears 62 and 64 could, if desired, be replaced by belts, chains, friction drives, or other drive mechanisms. Since the electric motor 60 generally operates at higher speeds than desired for the rotation of the roller 12, the gears 62 and 64 provide a speed reduction, and consequent torque increase, for the rotation of the drive lug 68. A coupling 8 (FIG. 5), which may be a clevis type coupling, of the roller 12 removably fits on the drive lug 68 for the desired rotation of the roller 12 about the axis 7. If desired, a self lubricating polymer sleeve 66 may be utilized in the aperture in the metal framework 70 through which the output shaft of the gear 62, which is connected to drive lug 68, passes. The gearing arrangement 59 is housed in an enclosure 84 coupled to the metal framework 70 in regions adjacent the top portion thereof by a plurality of fasteners 78 as shown on FIG. 7. In those embodiments of the present invention wherein the enclosure 84 is fabricated of plastic, a metal plate 76 is preferably included in a lower portion 84' of the housing 84 before the housing 84 is coupled to the metal framework 70. FIG. 8 depicts the underside surface 85 of the upper portion 84" of the housing 84 and shows reinforcing ribs 86 extending thereacross in orthoganal directions. Other alignments of reinforcing ribs could be utilized as desired in particular applications. Apertres 88 are provided in then upper portion 84" of housing 84. The upper end of the gear shaft 64' connected to gear 64 extends through one of the apertures 88 and the upper end of the gear shaft 62' connected to gear 62 extends through the other aperture 88 after the housing 84 is assembled and connected to the metal framework 70. Bosses 92 extend from the underside 85 of the upper portion 84" of housing 84 and are provided with screw accepting apertures 93 therethrough. Screws (not shown) may be utilized in the screw accepting apertures 93 for coupling the upper portion 84" of housing 84 to the lower portion 84' of housing 84. The bosses 92 also bear against, for example, the metal plate 76 in the lower portion 84' of housing 84 to add rigidity to the assembled structure. Self lubricating end bearings 100 (FIG. 6A) may be utilized in the apertures 88 for the rotating gear shafts 62' and 64'. Similarly, the motor shaft 60' extends through another self lubricating bearing 65 in the metal framework 70 to reduce any tendency of the gear 64 to wobble in those embodiment where the motor shaft 60' of motor 60 has a great axial length. A bracing bar 104 is provided to aid in maintaining the proper center spacing of the gears 62 and 64. Two columns 72 and 72' extend vertically upwardly from the base plate 74 and the metal framework 70 coupled to the two columns 72 and 72'. The column 72 is provided with an aperture 105 and a control switch 106 is mounted in the aperture 105 to provide ON-OFF control of the motor 60.

In operation, food to be mashed is placed in the bowl 50 and the bowl 50 is placed on the base plate 74. In some applications it may be desirable to lubricate the base plate 74 for smoother rotation of the bowl 50. The switch 106 is turned to the ON position thereof and the motor 60 rotates the motor shaft 60' about axis 101. The gear 64 is rotated by the motor shaft 60' and drives the gear 62 which is coupled to the coupling 8 on the roller 12 through drive lug 68. The roller 12 is rotated and the gear teeth 16 on the roller 12 drive the bowl 50 through engagement with teeth 58 on the inside surface 52 of the bowl 50. The rotation of the roller 12 forces food against the inside surface 52 of bowl 50 and mashes the food product.

Figure 9:
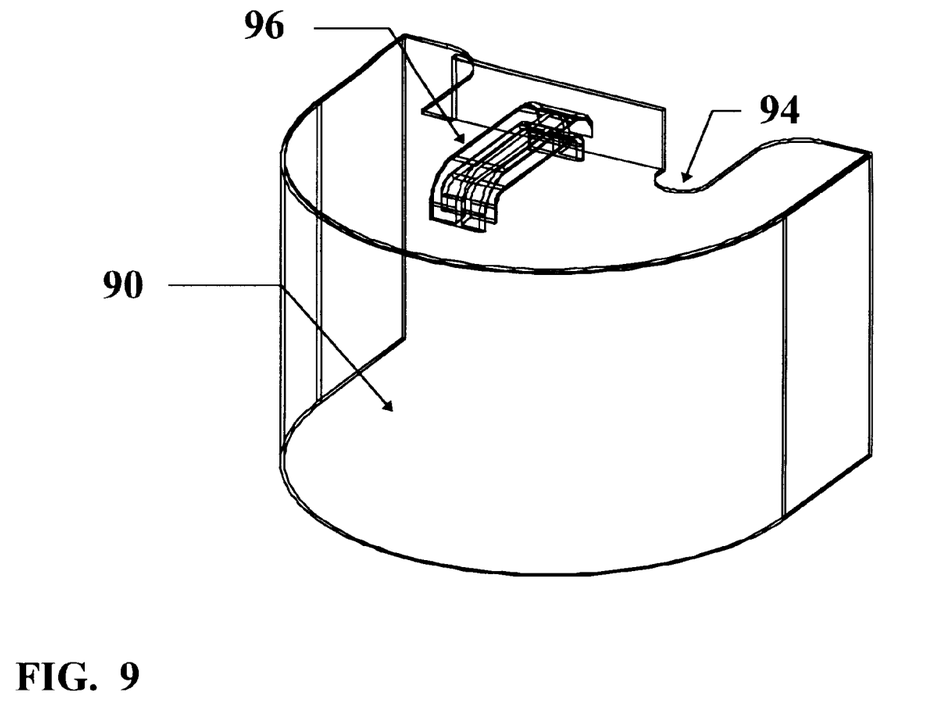
FIG. 9 is a perspective view of a cover useful in the practice of the present invention.

A cover 90 (FIG. 9) may be provided to fit over the bowl 50 both during operation of the embodiment 11 as well as when the food processing arrangement 13 is stored. A handle 96 may be provided on the cover 90.

Figure 10A:
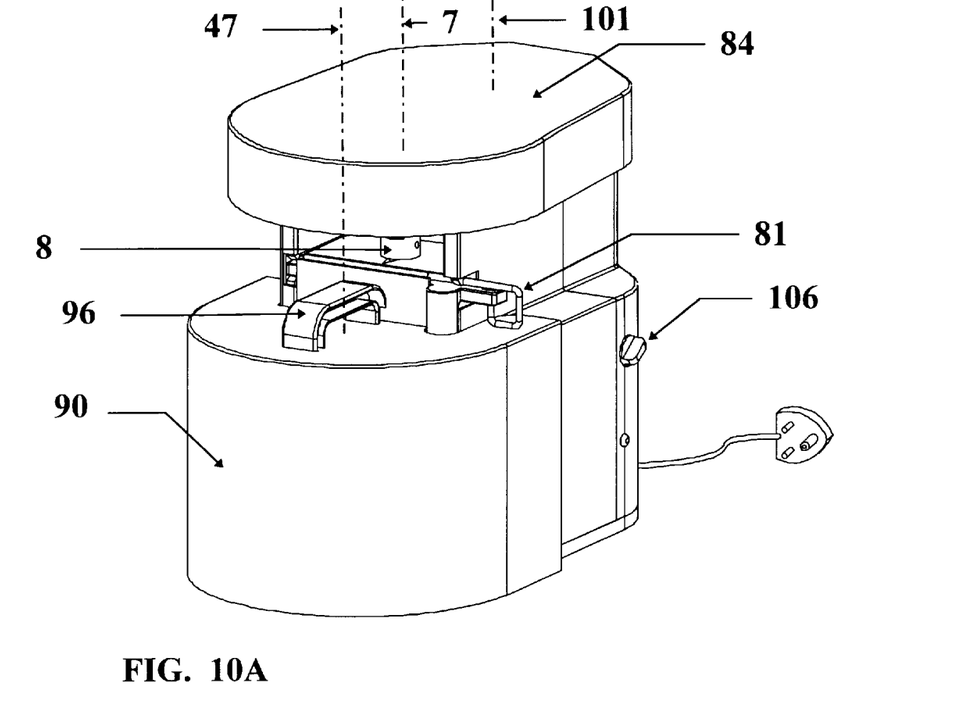
FIGS. 10A and 10B illustrate the food processor of FIG. 1 with the cover installed.
Figure 10B:
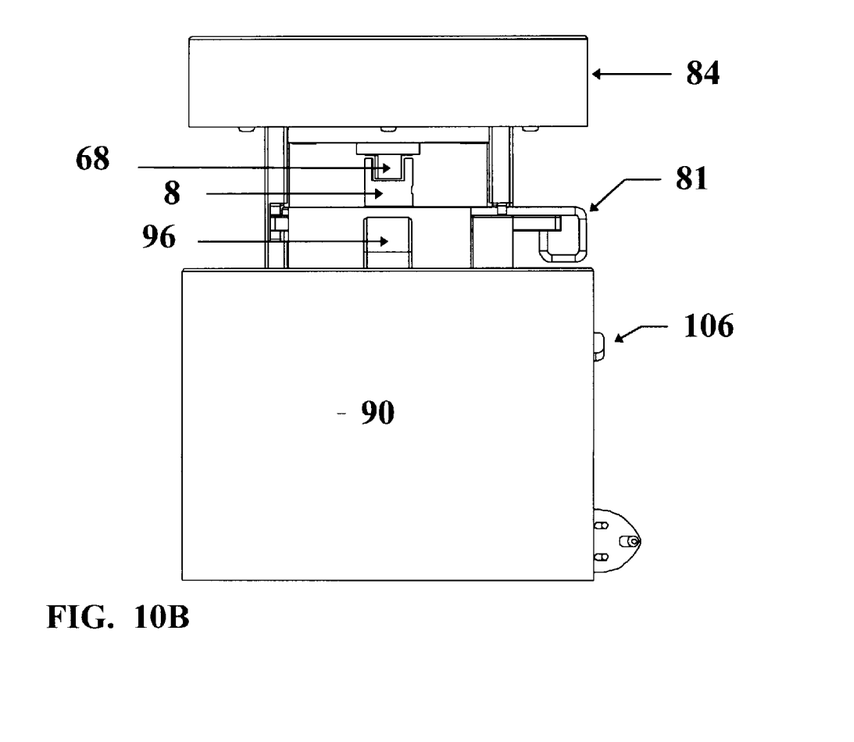

FIGS. 10A and 10B illustrate the food processing arrangement 13 in the assembled condition with the cover 90 in place over the bowl 50. The axis of rotation 101 of the motor shaft is offset from the axis of rotation 7 of the roller 12 which is also offset form the axis 47 of the rotation of the bowl 50. The rotational rate of the motor 60 is faster than the rotational rate of the roller 12 which, in turn, is faster than the rotational rate of the bowl 50.

This concludes the description of the preferred embodiments of the present invention. those skilled in the art may find many other variations and adaptations of the present invention and all such variations and adaptations falling within the true scope and spirit of the invention herein are intended to be covered by the appended claims.

What is claimed is:

1. An improved food processing arrangement comprising, in combination:
    a base unit having:
        a motor mounted on said base unit, said motor having a drive shaft for rotation by said motor about a first axis at a first predetermined rotational rate;
        a drive train operatively connected to said drive shaft of said motor for transmitting rotary motion thereof;
    a mashing unit removably mountable on said base unit and having:
        a frame member;
        a roller having an outer surface and mounted on said frame member for rotation about a second axis;
        a connection member coupled to said roller for detachably and operatively connecting said rotor to said drive train for rotation of said roller about a second axis at a second predetermined rotational rate;
        a scraper member having a first portion in food removing relationship to said roller for removing food from the outside surface of said roller;
        a pinion gear coupled to said roller for rotation therewith;
    a bowl movably and detachably mounted on said base unit and having:
        an outside surface;
        an inside surface defining a food receiving cavity and said inside surface in food mashing relationship to said roller for the condition of said roller rotating about said second axis;
        gear teeth on said inside surface operatively engaging said pinion gear on said roller, and said pinion gear rotating said bowl about a third axis at a third predetermined rotational rate for the condition of said roller rotating about said second axis, whereby food in said food receiving cavity of said bowl is mashed between said outside surface of said roller and said inside surface of said bowl.

2. The arrangement defined in claim 1 and further comprising:
    a mounting plate on said frame member of said mashing unit;
    said base unit having a rigid framework, and said rigid framework having first walls defining slots therein, and said mounting plate of said mashing unit removably mountable in said slots; and,
    key member removably mountable on said base unit and slidably engaging said rigid framework of said base unit and said mounting plate of said mashing unit for detachably retaining said mashing unit on said base unit.

3. The arrangement defined in claim 2 and further comprising:
    a detent on said mashing unit for removably restraining said key on said base unit.

4. The arrangement defined in claim 1 wherein:
    said outer surface of said roller has a first portion and a second portion;
    said first portion of said outer surface of said roller having a first preselected curvature and said first preselected curvature selected to provide substantially tangential contact of said first portion of said roller with said inside surface of said bowl; and
    said second portion of said outer surface of said roller having a geometric configuration other than said first preselected curvature.

5. The arrangement defined in claim 4 wherein:
    said geometric configuration of said second portion of said outer surface of said roller is planar.

6. The arrangement defined in claim 1 wherein:
    said motor of said base unit is mounted on said rigid framework thereof;
    said base unit further comprising:
        a base plate;
        a plurality of side roller bearings connected to said rigid framework in a predetermined spaced array and spaced from said base plate;
    said bowl is rotatably supported on said base plate of said base unit and said outside surface of said bowl engaging said side roller bearings whereby said side roller bearings provide reaction to the forces generated by said roller mashing food against said inside surface of said bowl.

7. The arrangement defined in claim 1 wherein:

said scraper further comprises:

a second portion in food removing relationship to said inside surface of said said bowl for removing food therefrom for the condition of said bowl rotating.

8. The arrangement defined in claim 1 wherein:

said drive train of said base unit further comprises:

a first gear connected to said drive shaft of said motor;

a second gear mounted in gear engaging relationship to said first gear and rotated thereby, and said second gear having a gear shaft and said gear shaft having a drive lug thereon;

said connection member of said mashing unit comprising a clevis member for detachable coupling to said drive lug; and said gear shaft of said second gear of said drive train rotating about said second axis.

9. The arrangement defined in claim 8 wherein:

said first axis is offset from said second axis and offset from said third axis.

10. The arrangement defined in claim 9 and further comprising:

a rigid bracing bar extending between said first gear and said second gear for maintaining a predetermined spacing therebetween.

11. The arrangement defined in claim 1 wherein:

said bowl further comprises a bottom plate;

a plurality of base rollers mounted on an external surface of said bottom plate.

12. The arrangement defined in claim 11 further comprising:

a mounting plate on said frame member of said mashing unit;

said base unit having a rigid framework;

and wherein said motor of said base unit is mounted on said rigid framework thereof;

said base unit further comprising:

a base plate;

a plurality of side roller bearings connected to said rigid framework in a predetermined spaced array and spaced from said base plate;

said base rollers of said bowl rotatably support said bowl on said base plate of said base unit and said outside surface of said bowl engaging said side roller bearings whereby said side roller bearings provide reaction to the forces generated by said roller mashing food against said inside surface of said bowl.

13. The arrangement defined in claim 12 wherein:

said scraper further comprises:

a second portion spaced from said first portion and said second portion in food removing relationship to said inside surface of said said bowl for removing food therefrom for the condition of said bowl rotating; and said first portion and said second portion of said scraper positioned to scrape food into the spacing therebetween.

14. The arrangement defined in claim 1 and further comprising:

a cover member for covering said bowl and said covering member removably mountable on said base unit to cover said bowl.

* * * * *